United States Patent Office 3,247,000
Patented Apr. 19, 1966

3,247,000
REFRACTORY BODIES AND METHOD OF MAKING SAME
Kenneth M. Taylor, Lewiston, N.Y., assignor to The Carborundum Company, Niagara Falls, N.Y., a corporation of Delaware
No Drawing. Filed Oct. 16, 1961, Ser. No. 145,452
10 Claims. (Cl. 106—57)

This invention relates to refractory bodies. More particularly, it relates to alumina-zirconia bodies having a high strength coupled with a high resistance to thermal shock and a method of making the same.

Alumina has been extensively used in various refractory applications. Nevertheless, it is subject to one serious limitation which the art has been unable to overcome. Alumina refractory bodies have a relatively low resistance to thermal shock. This limitation is also characteristic of many other high-strength refractories. Heretofore, efforts to overcome this weakness of alumina bodies by the modification of the alumina through the addition of zirconia or other materials without detraction from the normal high strength properties of alumina has been made but have failed to produce the desired results for one reason or another.

It is an object of the present invention to produce alumina-zirconia bodies that have an unexpectedly high resistance to thermal shock without sacrificing the normal high strength of alumina bodies.

It is a further object to produce alumina-zirconia bodies of improved strength and resistance to heat shock.

It is a still further object to provide methods of making alumina-zirconia bodies of high resistance to heat shock while actually enhancing the high strength properties of such bodies.

I have found that the thermal shock resistance of alumina bodies can be markedly improved without sacrifice of their high strength properties by the inclusion of from 15 to 30% by weight, and preferably 20 to 25% by weight, of zirconia with the alumina of the raw batch. I have further found that optimum results with respect to resistance to heat shock, are obtained when the bodies are formed and fired so as to provide a porosity of 3–13%, and preferably 3–7%, and the fired bodies are subjected to a thermal shock treatment as more fully described later herein.

According to the present invention, the refractory bodies consist essentially of alumina and monoclinic, unstabilized zirconia, the zirconia comprising from 15 to 30 percent by weight, and preferably 20 to 25 percent by weight of the refractory body. These bodies can be formed by cold pressing or casting followed by sintering, or can be formed by hot pressing techniques. Bodies so formed show a marked resistance to thermal shock while maintaining high strength, particularly when the forming and firing steps are such that the fired body has a porosity of 3 to 13%, and preferably between 3 and 7%. It is preferred to subject the body to at least one thermal cycle in which it is heated to approximately 1400° C. and rapidly cooled after sintering or hot pressing. It has been found that this thermal shock treatment increases the strength of the refractory body markedly.

The scientific explanation for the excellent shock resistant properties of refractory bodies made according to this invention as contrasted with bodies made from 100 percent aluminum is not fully understood. Thermal expansion is one of the principal physical properties that governs resistance to thermal shock. A low thermal expansion generally contributes to good thermal shock resistance. Alumina expands at a uniform rate to relatively high values and thus must be avoided when both high strength and resistance to thermal shock are required. On the other hand, unstabilized zironcia is known to go through a severe and destructive inversion both during heating and cooling. Thus, on heating unstabilized zirconia bodies, there is a strong reversal in the thermal expansion between about 1100° C. and 1200° C. It is therefore surprising to find that when 15 to 30% by weight of an unstabilized, monoclinic zirconia is added to the alumina from which refractory bodies are made, and particularly when the bodies are made with a porosity of 3–13%, that the resulting bodies have both high strength and satisfactory resistance to thermal shock. It is believed from a study of the thermal expansion characteristics of the resulting bodies that the presence of the zirconia in appropriate controlled amounts in the body imparts a slight or mild inversion behavior in the thermal expansion characteristics curve of the body in the region of 1000° C. to 1300° C. whereby the body is provided with greater resistance to thermal shock. Tests show that the addition of as much as 10 percent by weight of unstabilized zirconia to alumina does not result in any inversion. When the refractory consists of 15 percent zirconia and 85 percent alumina, a mild inversion occurs. The inversion is well developed in bodies containing 20 to 30 percent zirconia and 80 to 70 percent alumina. However, when the body comprises 60 percent alumina and 40 percent zirconia, the inversion is very large. Such a drastic inversion is itself destructive of the body and thus is not satisfactory.

*Table 1*
EFFECT OF Al$_2$O$_3$/ZrO$_2$ RATIO ON STRENGTH

| Body No. | Composition | | Fired five hours at ° C. | Modulus of rupture at 25° C. | | | |
|---|---|---|---|---|---|---|---|
| | Percent Al$_2$O$_3$ | Percent ZrO$_2$ | | Percent porosity | Initial | After thermal shock treatment | Percent change in strength |
| 1 | 100 | 0 | 1,775 | 4.3 | 18,100 | 9,400 | −48.3 |
| 2 | 100 | 0 | [1] 1,700 | 14.3 | 17,100 | 7,200 | −58.2 |
| 3 | 90 | 10 | 1,700 | 8.9 | 18,100 | 9,800 | −45.9 |
| 4 | 85 | 15 | 1,600 | 11.8 | 24,600 | 22,400 | −9.1 |
| 5 | 80 | 20 | 1,600 | 12.5 | 19,400 | 29,600 | 52.4 |
| 6 | 75 | 25 | 1,600 | 10.2 | 16,000 | 21,300 | 32.9 |
| 7 | 70 | 30 | 1,600 | 13.5 | 17,400 | 24,100 | 38.0 |
| 8 | 60 | 40 | 1,700 | 6.2 | 9,500 | 5,800 | −38.9 |

[1] Fired two hours at 1,700° C.

Table I above shows the effect of different amounts of zirconia in alumina refractory bodies on the strength, as measured by the moduli of rupture, of such bodies. It is to be noted that bodies containing sufficient zirconia to impart a slight or mild inversion in the thermal expansion characteristics of the body, not only have a high initial strength, but that the strength actually increases as the result of thermal shock treatment. The thermal shock treatment consisted of cycling the test piece automatically into a furnace chamber at 1400° C., where the sample remained for 2½ minutes before emerging under the blast of air at room temperature. This heating and cooling cycle was repeated 30 times, after which the modulus of rupture was measured.

The resistance to thermal shock of refractory bodies made according to this invention can be seen in Table II, wherein the modulus of rupture of the refractory body of this invention composed of 75 percent alumina and 25 percent zirconia is compared with that of a body of 100 percent alumina after 0, 1, 5 and 30 thermal shocks wherein the refractory bodies, made in the same manner, were heated to 1400° C. and thereafter rapidly cooled. The modulus of rupture reported is the average of five bodies.

*Table II*

| Number of shock treatments | 0 | 1 | 5 | 30 |
|---|---|---|---|---|
| 100% Alumina | 17,810 | 8,507 | 6,031 | 7,244 |
| 75% $Al_2O_3$–25% $ZrO_2$ | 13,800 | 22,190 | 18,007 | 16,241 |

After only one shock cycle, the alumina body had less than half the strength of the body before shock treatment. The body made according to this invention was stronger after shock treatment than before. Even after 30 cycles, the body made according to this invention was stronger than before shock treatment.

In preparing the refractory bodies of this invention, it is desirable to subject the body to at least one thermal shock cycle after the body has been sintered or hot pressed. It is believed that the shock treatment builds up compressive forces in the outer fibers of the body, thereby increasing the strength of the body. Furthermore, it appears that these stresses lessen the thermal expansion.

Table III below shows the effect of porosity on the strength of bodies made according to the present invention, both before and after subjection to thermal shock treatment which consisted of thirty cycles of thermal shock from room temperature to 1400° C. Each group of test pieces consisted of eight specimens, and the figures of the table are averages for the entire number of specimens tested. It was found from a study of the data of all the individual tests that when the porosity was between 3 and 7% the increase in strength after thermal shock treatment was greatest, being as high as 125 percent increase for two bodies having porosities of 6% and 7%, whereas bodies having porosities above 7% up to 13% averaged 37% increase. Generally speaking, bodies of less than 3% porosity had poor thermal shock resistance.

*Table III*
75% $AL_2O_3$–25% $ZrO_2$ BODIES
[Effect of porosity on strength]

| No. of groups fired 5 hours at ° C.— | | | Average Modulus of Rupture at 25° C. | | | |
|---|---|---|---|---|---|---|
| 1,660 | 1,650 | 1,600 | Average percent porosity | Initial | After thermal shock treatment | Percent change in strength |
| 1 | 6 | 1 | 1.48 | 14,200 | 11,900 | −16.2 |
| ---- | 1 | 3 | 5.8 | 16,800 | 27,200 | 61.9 |
| ---- | ---- | 4 | 11.5 | 17,000 | 23,800 | 40.0 |

This invention will be more fully understood by reference to the following specific example. A raw batch was prepared consisting of 75 percent high-purity, calcined alumina powder and 25 percent low-hafnia zirconia. This batch was ball milled for 64 hours at 46 r.p.m. in a porcelain jar which was one-third full of flint pebbles. The resulting creamy slurry was dried to a firm consistency by stirring and heating to about 90° C. The dried cake was reduced by tumbling for one hour with rubber covered steel balls and the tumbled body was then trowled through a 10× silk screen. As a temporary binder, a 2 percent aqueous solution of carboxymethylcellulose gum was added. The batch was then tempered with water to a pressing consistency for about 10 minutes in a Ross mixer and put through 24-mesh wire screen. The batch was pressed to 3.5 by 0.6 by 0.3 inch bodies by double plunger action to 6,000 p.s.i. normal to the 3.5 by 0.6 face. The pressed bodies were air dried for at least 2 hours before being dried at 70° overnight. The dried bodies were then fired in an oil kiln. The temperature was raised 100 degrees per hour and was held at the maximum firing temperature of 1600° C. for 5 hours.

The first bodies were then subject to a thermal shock treatment consisting of placing the body into a furnace at 1400° C. where it remained for 2.5 minutes before emerging under a blast of room temperature air from a forge fan. This cycle was repeated 30 times.

While I specifically have described forming the refractory bodies by cold pressing and sintering, it is to be recognized that such bodies can either be cast and sintered or hot pressed. For example, if cast bodies are desired, a dried mix prepared as described above is mixed with water and a 2% sodium alginate solution and a 1–5 lithium citrate solution. This mixture was ball milled for 1 hour with rubber covered steel balls. Bodies were cast by pouring a slip into the mold cavity and vibrating the plaster mold until no further refilling was required. After relief of the body, normal drying procedure was used as described above and the products fired as normally. For hot pressing, satisfactory bodies were obtained holding the bodies at a maximum temperature of 1612° C. for about 5 minutes under a load of 2,000 p.s.i.

The bodies made in this manner had a modulus of rupture of 16,000 p.s.i. before thermal shock treatment and a modulus of 22,600 p.s.i. after thermal shock. The porosity of the bodies was about 13 percent. Successful results, however, have been achieved with bodies having densities from 65 to 99 percent of theoretical density. Minor amounts of impurities may be present in the body without affecting its characteristics. For example, up to 3 percent silica has been found in bodies made according to this invention without any noticeable adverse effect on the characteristics of the body.

While this invention has been described in term of the present preferred embodiments thereof, it should be recognized that it may be otherwise embodied within the scope of the following claims.

I claim:
1. A sintered refractory body consisting essentially of 75–80% by weight alumina and 25–20% by weight of unstabilized zirconia, said body having a porosity between 3 and 13%.
2. A sintered refractory body consisting essentially of 70–85% by weight of alumina and 30–15% by weight of unstabilized zirconia, said body having a porosity between 3 and 7%.
3. A sintered refractory body consisting essentially of 75–80% by weight alumina and 25–20% by weight of unstabilized zirconia, said body having a porosity between 3 and 7%.
4. A method of making refractory bodies having high strength coupled with high resistance to thermal shock which comprises the steps of preparing a raw batch consisting essentially of a finely divided mixture of 70–85 percent by weight of alumina and 30–15 percent by weight of monoclinic zirconia, forming said batch into a body of the desired shape and size and sintering said body at a temperature sufficient to provide a body having a porosity of between 3 and 13 percent.
5. A method of forming a refractory body having high strength and high resistance to thermal shock which comprises forming a raw batch consisting essentially of a finely divided mixture of about 70 percent to about 85 percent by weight of alumina and from about 30 percent to about 15 percent by weight of monoclinic zirconia, forming said batch into a body of the desired shape and size, sintering said formed body at a temperature and for a period of time sufficient to provide said body with a porosity of between 3 and 13 percent and increasing the strength of said refractory body by subjecting said body to at least one controlled thermal shock cycle which consists of rapidly heating said body to a temperature of about 1400° C. and then rapidly cooling said body.

6. The method as defined in claim 5 in which the formed body is sintered at a temperature of about 1600° C. for about 5 hours to provide said body with a porosity of between 3 and 13 percent.

7. The method as defined in claim 5 in which said body is formed by cold-pressing said raw batch.

8. The method as defined in claim 5 in which said body is formed by hot-pressing said raw batch.

9. The method as defined in claim 5 in which said body is formed by slip-casting said raw batch.

10. A sintered refractory body having high strength and high resistance to thermal shock, said body consisting essentially of from 70 percent to 85 percent by weight of alumina and from 30 percent to 15 percent by weight of unstabilized zirconia, said body having a porosity of between 3 and 13 percent and having a modulus of rupture which is increased following thermal shock treatment.

References Cited by the Examiner

UNITED STATES PATENTS

| | | | |
|---|---|---|---|
| 2,271,367 | 1/1942 | Fulcher et al. | 106—57 |
| 2,984,576 | 5/1961 | Alexander et al. | 106—57 |
| 3,025,175 | 3/1962 | Aldred | 106—65 |

FOREIGN PATENTS

| | | |
|---|---|---|
| 599,514 | 6/1960 | Canada. |
| 542,157 | 12/1941 | Great Britain. |

TOBIAS E. LEVOW, *Primary Examiner.*

JOHN H. MACK, *Examiner.*